United States Patent
Hsu et al.

(10) Patent No.: US 6,337,551 B1
(45) Date of Patent: Jan. 8, 2002

(54) CONTROL METHOD OF DYNAMICALLY CORRECTING STABILIZED ERROR OF A SPINDLE MOTOR IN AN OPTIC STORAGE DEVICE

(75) Inventors: Andy Hsu; Frankie Fu; Joe Tsai; Kevin Tsai, all of Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 09/754,318

(22) Filed: Jan. 5, 2001

(51) Int. Cl.$^7$ .............................................. G05B 11/01
(52) U.S. Cl. ........................ 318/560; 318/569; 369/47.1
(58) Field of Search .................... 318/560, 563, 318/569, 638, 652; 369/47.1, 47.14, 47.12, 53.13, 59.1

(56) References Cited

U.S. PATENT DOCUMENTS 5,111,349 A * 5/1992 Moon ........................... 369/32
5,577,011 A * 11/1996 Jung ............................. 369/47
5,726,958 A * 3/1998 Min .............................. 369/32

* cited by examiner

Primary Examiner—Khanh Dang
(74) Attorney, Agent, or Firm—Rosenberg, Klein & Lee

(57) ABSTRACT

A control method for dynamically correcting stabilized error of a spindle motor in an optic storage device. The control method comprises the steps of:

(a) At first, under the condition that the spindle motor is stable, checking a rotary speed of the spindle motor so that an initial constant offset value is acquired according to said rotary speed, (b) Reading the stabilized error of the system and determining whether the constant offset value should be corrected, (c) Then, using a control mode of section dividing and staged value to modify the constant offset value, and (d) Suppressing the stabilized error to a minimum value.

9 Claims, 4 Drawing Sheets

CONTROL METHOD OF DYNAMICALLY CORRECTING STABILIZED ERROR OF A SPINDLE MOTOR IN AN OPTIC STORAGE DEVICE

FIELD OF THE INVENTION

The present invention relates to a control method for dynamically correcting stabilized error of a spindle motor in an optic storage device, and especially to control method for suppressing the stabilized error of the spindle motor to a reasonable value. No oscillation may occur in the spindle motor. Thus, the quality of recording can be improved.

BACKGROUND OF THE INVENTION

The data of the compact disk is arranged spirally on a compact disk. The data is arranged on a compact disk from outer side to the inner side. Therefore, the data track of the compact disk is a continuous spiral track instead of being formed by a plurality of concentric circles.

The way for a compact disk drive to detect the position of the reading head with respect to the compact disk, referring to a specification, a Q code is engraved on the disk. The Q codes are placed on a track with a fixed length, and are arranged from the inner portion to the outer portion with an equal space. Therefore, the compact disk drive only reads the Q code for detecting the position of the head. Thereby, data can be transferred to the next stage. Therefore, it is know that a compact disk recorder records data with a constant linear velocity (LCV) along a track from an inner part to a outer part.

Before the CD-R and CD-RW record data, the compact disk in the compact disk drive has no any data and no Q code. Therefore, the follow trouble induced.

1. The compact disk drive can not detect the current position of the reading head.
2. The compact disk drive can not be recorded in a correct constant linear velocity.
3. The UDF format can not be supported.
4. The surplus space in the compact disk can not be known.
5. The manufacture and characters of the compact disk can not be known.
6. The optimum power control (OPC) can not be executed so that the recording quality is affected.

Therefore, wobble signal is engraved on the CD-R, and CD-RW compact disks. The wobble signal is engraved on a blank track by FM modulation for recording the address of each point in the compact disk and other information. The system reads data by FM modulation so as to resolve the aforesaid problem.

In general, the address of the wobble signal is referred to the length and density of the Q code absolutely for achieving the object of backward compatibility to a CD-RW. Therefore, as a CD-RW burner records a compact disk, it must refer to the position of the wobble signal, and at the same time records the position of the Q code and records the Q code on the compact disk.

According to the specification of CD-R and CD-RW (SONY and Philips), the wobble signal is demodulated by FM demodulation so as to generate an ATIP (Absolute Time in Pre-groove) information. The specification defines that the Sub-Sync. (head of a Q code) and ATIP sync (head of ATIP) can not be over two 8-14 EMF frame, referring to FIG. 1. As recording in a CLV, in order to reduce the error between the Sub-Sync and ATIP sync, in a general control way, the gain in lower frequency is increased and an integrator is added. However, this way will induce the oscillation of a spindle motor and thus the error rate of cyclic redundancy check is increased as a compact disk drive reads the ATIP signal. Moreover, the recording quality is reduced due to unsteadiness of the motor

SUMMARY OF THE INVENTION

Accordingly, the primary object of the present invention is to provide a control method for dynamically correcting stabilized error of a spindle motor in an optic storage device, wherein a section division and staged value control mode is used to suppress the stabilized error of the spindle motor to a reasonable value. No oscillation may occur in the spindle motor. Thus, the quality of recording can be improved.

The various objects and advantages of the present invention will be more readily understood from the following detailed description when read in conjunction with the appended drawing.

DETAILED DESCRIPTION OF THE PREFERRED EMBODIMENTS

A control method for dynamically correcting stabilized error of a spindle motor in an optic storage device, wherein a section division and value and staged value control mode are used to suppress the stabilized error of the spindle motor to a reasonable value.

Figure 1:
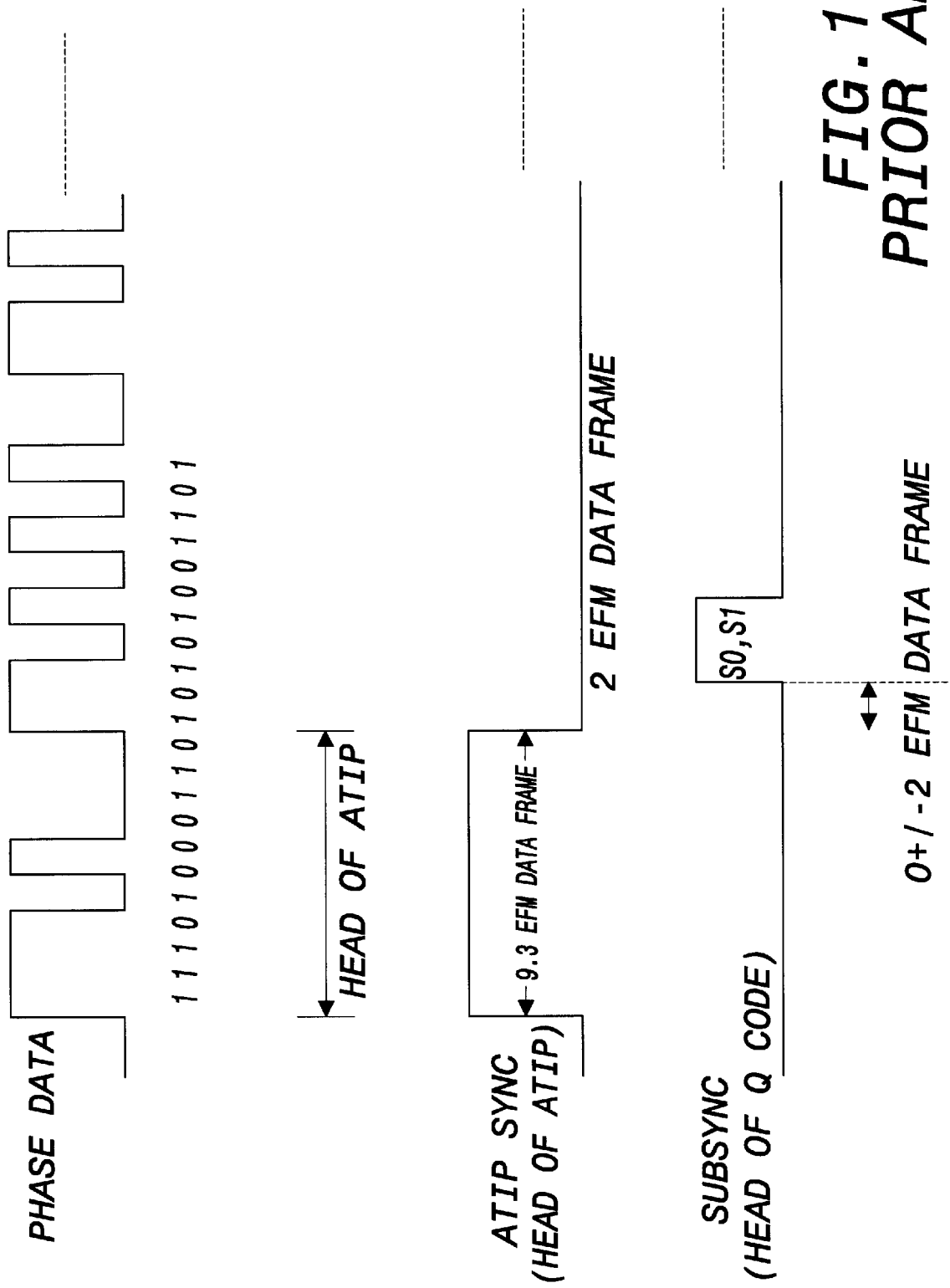
FIG. 1 shows the error condition according to the specification defined n the ATIP Sync, and Sub Sync.
Figure 2:
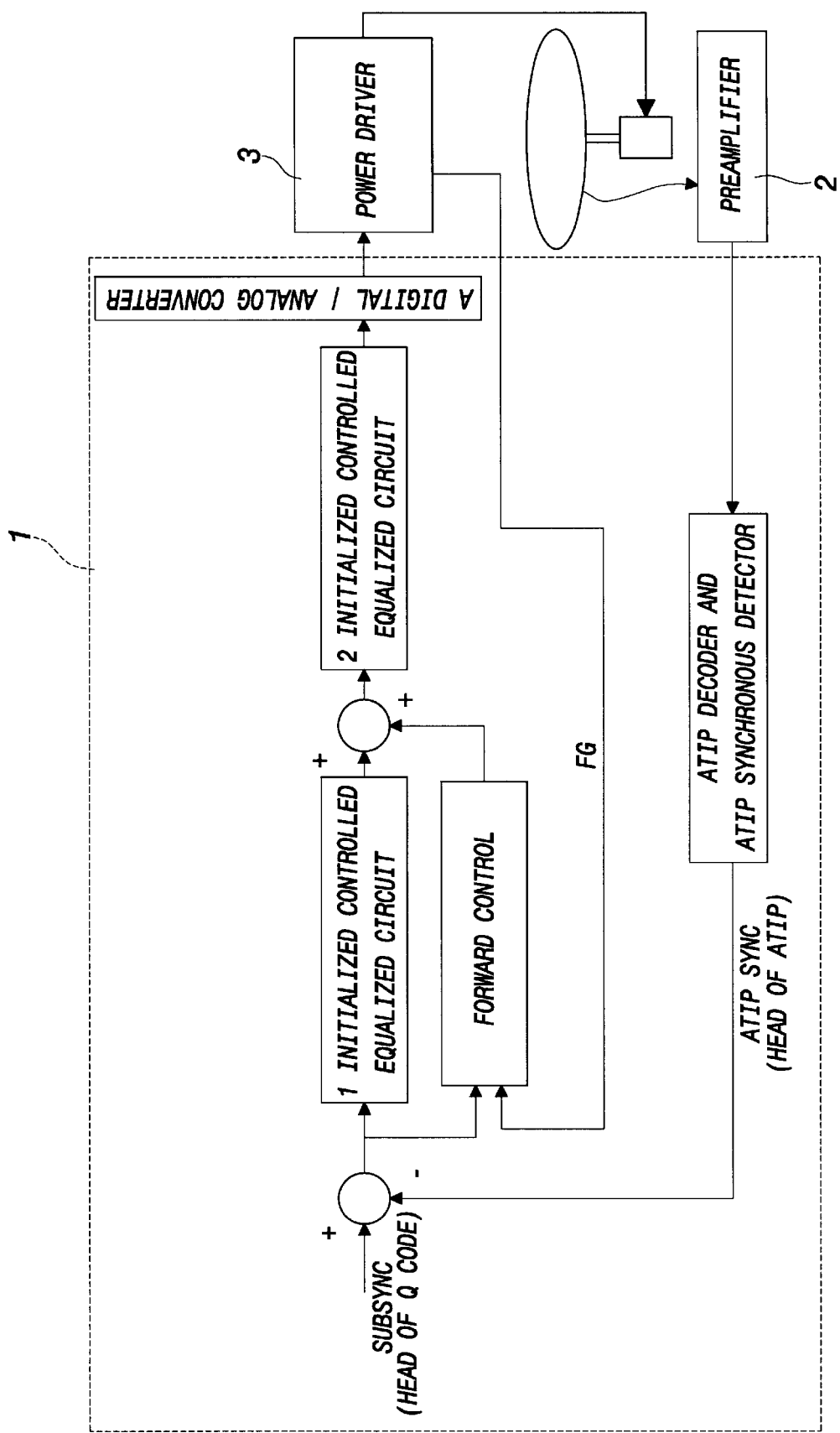
FIG. 2 shows the relation of the forward control and the system construction in the present invention.

Referring to FIG. 2, the structural relation of the forward controlled and spindle motor control systems of the present invention is illustrated. The spindle motor control system is formed by a digital signal processing system 1, a pre-amplifier 2, a power driver 3, etc. The digital signal processing system 1 is disposed by an initialized controlled equalized circuit 1, an initialized controlled equalized circuit 2, a digital/analog converter, an ATIP decoder, and an ATIP synchronous detector in an ASIC chip. By the programming and operation of the ASIC chip, the error of stabilizing voltage of a spindle motor is within a range of reasonable value.

Figure 3:
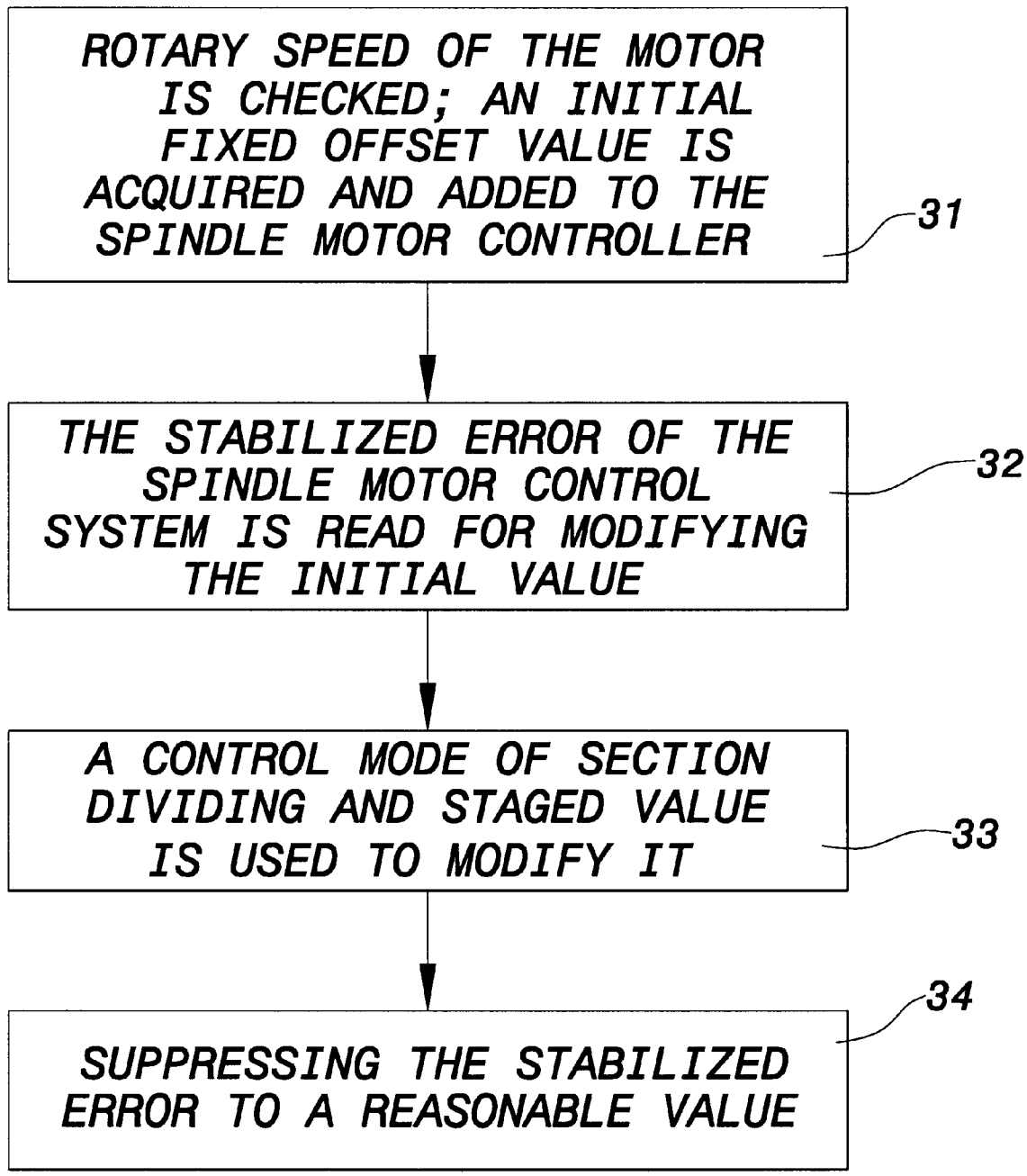
FIG. 3 shows a control flow of the present invention.
Figure 4:
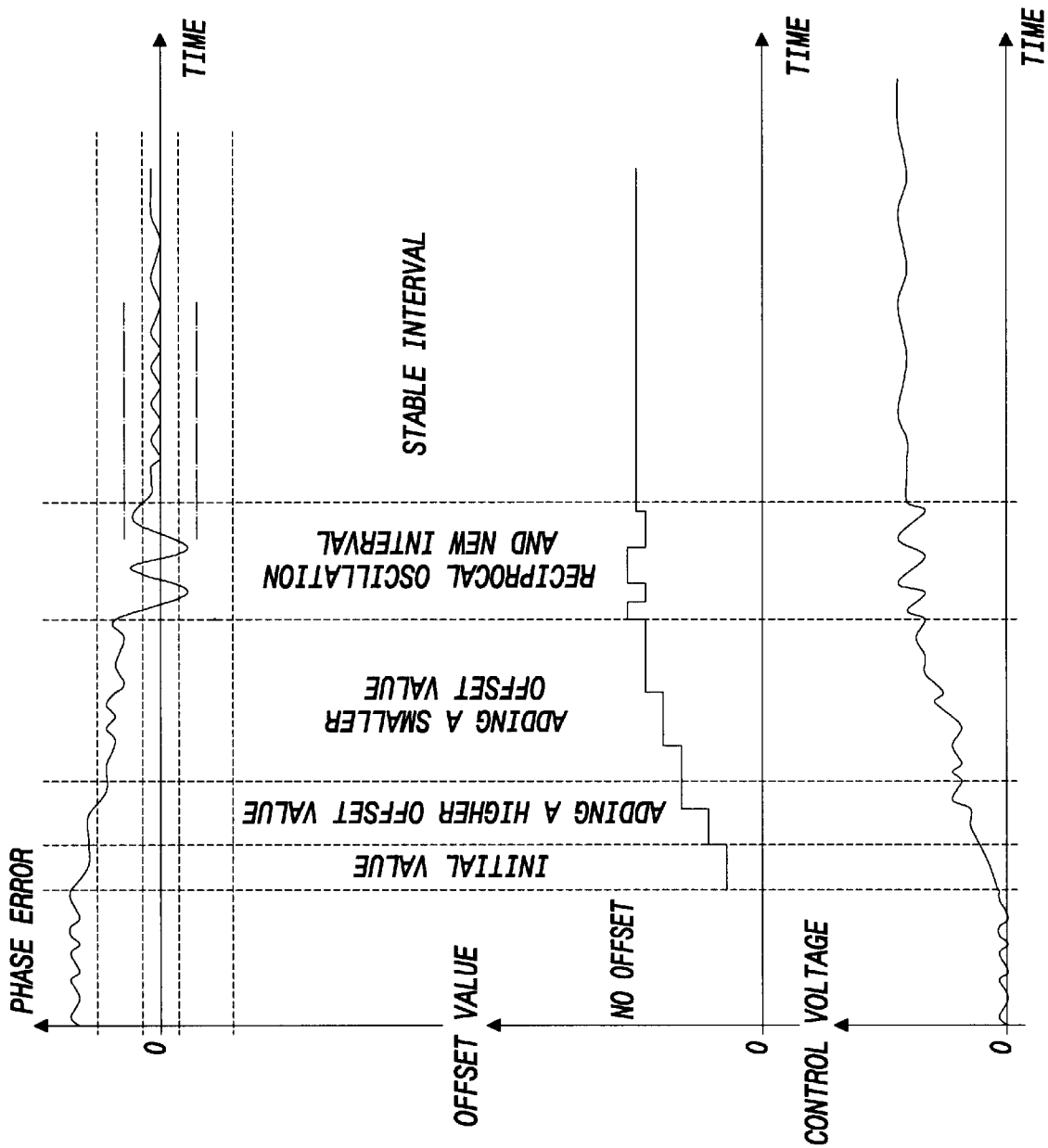
FIG. 4 is a control of time domain in the present invention.

Referring to FIGS. 3 and 4, in the control of the present invention, at first, under the condition that the spindle motor is stable, the rotary speed of the current motor is checked. The rotary speed of the motor is multiplied with a gain value, then an initial value is acquired (initial fixed offset value). The initial value is added to the spindle motor controller by a feed forward compensation way for reducing the stabilized error between the ATIP sync. and Sub Sync (step 31).

Then, the stabilized error of the spindle motor control system is read for modifying the initial value (step 32).

Next, a control mode of section dividing and staged value is used to modify it (step 33) for suppressing the stabilized error to a reasonable value (step 34).

In the present invention, the control mode of section dividing and staged value is used in modification, in that the stabilized error is divided into several intervals. Initially, three intervals, (1) a high error interval, (2) a middle error interval and (3) a lower error interval are used.

In the high error interval, a higher and fixed offset value is added to or subtracted from the initial value, and then, the error is checked again. Then, the process is repeated, until the error is reduced and then the process enters into the middle error interval.

If the offset value is added thereto and subtracted therefrom repeatedly so that the errors are oscillates reciprocally around the "middle error interval". Then the middle error interval is enlarged so that the error successfully drops into the range of "middle error interval" and the current offset value is fixed. This is defined as OFF 1.

In this "middle error interval", a smaller and fixed offset value is added to or subtracted from the OFF 1, so that the error approaches to the "lower error interval". If the offset value is added to and subtracted from the initial value repeatedly so that the errors are oscillates reciprocally around the "middle error interval".

If the offset value is added thereto and subtracted therefrom repeatedly so that the errors are oscillates reciprocally around the "low error interval". Then a "new lower error interval" is added, which is between the "middle error interval" and "lower error interval" so that the error enters into the "lower error interval". Then, the offset value is fixed and is defined as OFF 2.

In the "new lower error interval", a further smaller and fixed offset value is added to the OFF 2, so that the "lower error interval" approaches to the "lower error interval". The process is repeated until the error enters into the "lower error interval". Then the whole process is complete. As such, the stabilized error of the spindle motor of a CD burner can be suppressed in a reasonable value.

In summary, the control way of the present invention has the following advantages:

1. If the offset value is added thereto and subtracted therefrom repeatedly so that the errors are oscillates reciprocally around the "middle error interval" effectively.
2. No oscillation may occur in the spindle motor.
3. The quality of recording can be improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A control method for dynamically correcting a stabilized error of a spindle motor in an optic storage device, wherein a section division and staged value control mode are used to suppress the stabilized error of the spindle motor to a reasonable value, comprising the steps of:

(a) checking a rotary speed of the spindle motor so that an initial constant offset value is acquired according to the rotary speed and is inputted to a control of the spindle motor;

(b) reading the stabilized error of the system and determining whether the constant offset value should be corrected;

(c) dividing the error into several intervals;

(d) defining a maximum error interval using a larger correcting value to suppress the stabilized error to a next interval with a smaller range rapidly;

(e) if the next interval cannot be entered, then the process being operated in a new interval with a smaller correcting value so as to further reduce the stabilized error for entering into a next section, upon the process being operated in a new section, a further small correcting value being used for further reducing the stabilized error;

(f) defining a minimum error interval, upon the process entering into this interval, the correcting value not being calculated further, and the error having matched the requirement of a system; and (g) checking whether the error exceeds the minimum error interval, upon the error exceeding the interval, a correcting value in the previous interval being used for suppressing the stabilized error into a minimum error interval.

2. The control method for dynamically correcting stabilized error of a spindle motor in an optic storage device as claimed in claim 1, wherein a number of the intervals in step (c) is adjusted according to the requirement of a system so as to reduce the stabilized error in a step reducing way process.

3. The control method for dynamically correcting stabilized error of a spindle motor in an optic storage device as claimed in claim 1, wherein if the stabilized error can not be suppressed into a next interval in step (d), then the interval is enlarged so that the process enters into the next interval or a new interval is defined before the process enters into a next interval, so that the process passes through this stage successfully.

4. The control method for dynamically correcting stabilized error of a spindle motor in an optic storage device as claimed in claim 1, wherein the correcting value in step (d) is adjustable according to a requirement of a system, and the correcting value is set referring to the interval.

5. The control method for dynamically correcting stabilized error of a spindle motor in an optic storage device as claimed in claim 1, wherein the correcting value in step (e) is adjustable according to a requirement of a system, and the correcting value is set with reference to the interval.

6. The control method for dynamically correcting stabilized error of a spindle motor in an optic storage device as claimed in claim 1, wherein the correcting value in step (f) is adjustable according to a requirement of a system, and the correcting value is set with reference to the interval.

7. The control method for dynamically correcting stabilized error of a spindle motor in an optic storage device as claimed in claim 4, wherein the correcting value of each interval is a constant value, namely, the correcting value is updated as an interval is updated.

8. The control method for dynamically correcting stabilized error of a spindle motor in an optic storage device as claimed in claim 5, wherein the correcting value of each interval is a constant value, namely, the correcting value is updated as an interval is updated.

9. The control method for dynamically correcting stabilized error of a spindle motor in an optic storage device as claimed in claim 6, wherein the correcting value of each interval is a constant value, namely, the correcting value is updated as an interval is updated.

* * * * *